United States Patent [19]
Landry et al.

[11] Patent Number: 5,190,819
[45] Date of Patent: * Mar. 2, 1993

[54] FIBERS FORMED OF BLENDS OF ETHERIC PHOSPHAZENE POLYMERS AND METAL OXIDES AND THE METHOD OF THEIR FORMATION

[75] Inventors: Christine J. T. Landry, Honeoye Falls; Wayne T. Ferrar; Bradley K. Coltrain, both of Fairport, all of N.Y.

[73] Assignee: Eastman Kodak Company, Rochester, N.Y.

[*] Notice: The portion of the term of this patent subsequent to Apr. 23, 2008 has been disclaimed.

[21] Appl. No.: 765,786

[22] Filed: Sep. 26, 1991

Related U.S. Application Data

[62] Division of Ser. No. 450,964, Dec. 15, 1989, Pat. No. 5,104,602.

[51] Int. Cl.$^5$ .................................................. D02G 3/00
[52] U.S. Cl. ..................................... 428/357; 428/364; 428/373; 428/379; 428/384; 524/404; 524/420
[58] Field of Search ............... 428/364, 357, 373, 379, 428/384, 389; 524/404, 420, 430, 431; 528/399

[56] References Cited

U.S. PATENT DOCUMENTS

| | | | |
|---|---|---|---|
| 3,732,175 | 5/1973 | Allcock | 528/399 |
| 3,867,341 | 2/1975 | Kyker | 524/87 |
| 3,883,451 | 3/1975 | Reynard et al. | 528/399 |
| 3,945,966 | 3/1976 | Vicic et al. | 428/65 |
| 4,064,095 | 12/1977 | Oberster et al. | 524/122 |
| 4,080,353 | 3/1978 | Monte et al. | 524/141 |
| 4,198,310 | 4/1980 | Lyons et al. | 252/400.2 |
| 4,711,916 | 12/1987 | Masataka et al. | 29/894.331 |
| 4,752,630 | 6/1988 | Sterzel et al. | 523/307 |
| 5,010,128 | 4/1991 | Coltrain et al. | 524/404 |

*Primary Examiner*—Patrick J. Ryan
*Assistant Examiner*—N. Edwards
*Attorney, Agent, or Firm*—Doreen M. Wells

[57] ABSTRACT

The invention provides fibers formed of a blend of metal oxide, such as titanium or zirconium oxide, with etheric phosphazene. The invention optionally contains salt for antistatic fibers. The composition of the invention is formed by preparing solutions of etheric phosphazene and inorganic alkoxides, such as titanium isopropoxide. The solutions are then formed into fibers and cured at room temperature or with moderate heating. Fibers produced can be extensible, tough, hard, flexible, or brittle. They are multicomponent blends of the titaninum or zirconium oxide and phosphazene. The composite may be doped with low lattice energy salts to form conductive fibers.

10 Claims, No Drawings

FIBERS FORMED OF BLENDS OF ETHERIC PHOSPHAZENE POLYMERS AND METAL OXIDES AND THE METHOD OF THEIR FORMATION

This is a divisional of application Ser. No. 450,964, filed Dec. 15, 1989 is now U.S. Pat. No. 5,104,602.

TECHNICAL FIELD

This invention relates to composite fiber materials that are blends of etheric phosphazenes and metal oxides. Specifically, this invention relates to fibers comprising an etheric phosphazene blended with a metal oxide formed in a sol-gel process by hydrolysis and condensation of a metal alkoxide.

BACKGROUND ART

Composites of Etheric Phosphazenes and metal oxides have been proposed in copending and coassigned U.S. Ser. No. 329,216—Coltrain et al filed Mar. 27, 1989. The formation of films of the composite materials, possibly with antistatic properties, is proposed in Coltrain et al.

Phosphazene polymers have also been suggested for use where higher temperature polymers are desirable such as in gaskets for engines, in friction surfaces, and as membranes for separations of gases or liquids. Such uses would not require the addition of salt as the gasket, or friction materials would not need to be conductive or have antistatic properties. In use as a gasket material, membranes, or friction surface, as well as in polymer film antistatic surface coats, it is advantageous that the polymer has good abrasion resistance, hardness, and strength. Therefore, it would be desirable if these properties could be improved for phosphazene polymers.

It has been disclosed in U.S. Pat. No. 4,218,556—Hergenrother et al that chlorophosphazene polymers can be cross-linked with tetraalkylorthosilicate. Great Britain Patent 1,052,388—Emblem et al discloses that phosphazene trimeric materials may be cross-linked with similar silicates. However, these cross-linked materials have the disadvantage that they are difficult and expensive to make and are not believed to be abrasion-resistant or tough. U.S. Pat. No. 4,026,839—Dieck et al discloses polyphosphazene polymer and silicone rubber blends that are fire retardant and may form foams. U.S. Pat. No. 4,668,762—Ogata and U.S. Pat. No. 3,304,270—Dickerson also disclose silicon phosphorus containing polymer compositions. It has been disclosed in Exarhos et al, "$^{31}P$ NMR Studies of Aqueous Colloidal Dispersions Stabilized by Polyphosphazene Adsorption", J. Am. Ceram. Soc., 71 (9) C-406-C-407 (1988), and Exarhos et al "Molecular Spectroscopic Characterization of Binding Interactions in Phosphazene Stabilized Alumina Dispersions", October 1987, presented at the Materials Research Society 23rd University Conference on Ceramic Science held in Seattle, Wash., Aug. 31, 1987, that polyphosphazenes can be utilized to stabilize alumina dispersions. In the process disclosed in the Exarhos et al articles, a small amount of polyphosphazene is mixed with a large amount of large (0.4 micron diameter) aluminum particles. The purpose of the Exarhos et al processing is to form densified ceramic materials by utilizing polyphosphazene as a binder.

There remains a need for phosphazene polymer fibers that have improved properties of cost, ease of formation, strength, and toughness. Flame-retardant behavior, biocompatibility, transparency, and dissipation of static charge in phosphazene fiber materials also is desirable.

Polyphosphazene antistatic compositions recently have been proposed in copending and coassigned application Ser. No. 087,480 filed Aug. 20, 1987, by Chen et al. In the copending application polyphosphazene is combined with a salt in order to form a conductive composition. This composition has been suggested for use in photographic antistatic layers. While a satisfactory antistatic composition, the material is somewhat tacky and not altogether suitable as an outer coating. Cyclic phosphazenes have also been disclosed for antistatic layers in Japanese Application 129882—Konishiroku published Dec. 11, 1987.

DISCLOSURE INVENTION

The invention provides fibers that are multicomponent blend of metal oxide, such as titanium oxide or zirconium oxide, with an etheric phosphazene polymer. The formation of fibers from etheric phosphazenes is significant because these polymers by themselves are amorphous gums that flow at room temperature. The multicomponent blend is produced by a sol-gel process involving the hydrolysis and condensation of a metal alkoxide. The invention fibers optionally contain salt for blends utilized in forming conductive fibers. The preferred compositions of the invention are formed by preparing solutions of phosphazene and inorganic monomers, such as titanium isopropoxide, and optionally a salt. The solutions are then extruded or drawn into fibers and cured at room temperature or with moderate heating. There are no covalent cross-links between the phosphazene and the metal oxide. It is also within the invention to form the blends with other metal precursors, rather than titanium and zirconium, such as tantalum, silicon, lead, phosphorus, aluminum, boron, tin, iron, copper, lanthanum, germanium, yttrium, or indium. Barium oxide and magnesium oxide mixtures with the above metal oxides also may be utilized in the invention.

MODES FOR CARRYING OUT THE INVENTION

The invention has numerous advantages over other metal oxide and polymer systems and other non metal oxide blended phosphazenes. It is unexpected that an easily formed multicomponent blend of materials produces a strong, fibrous phosphazene material. The invention is easy to perform in that the two materials are merely blended, not chemically reacted, prior to extrusion. Therefore, there are no difficult to control reactions taking place. The materials of the invention form a fiber that may be handled without tackiness. The materials make a strong conductive antistatic fiber by addition of a salt. These and other advantages of the invention will be apparent from the description that follows.

A preferred method of the invention generally is carried out by dissolving an etheric phosphazene material in a solvent, such as alcohol, with stirring. Into the stirred solution of polyphosphazene and alcohol is added a metal oxide precursor, such as titanium isopropoxide. Hydrolysis of the solution is carried out by atmospheric moisture, although acidic water, such as dilute HCl, can also be added. The solution is then extruded or drawn into fibers and cured at a temperature of up to about 200° C.

Any suitable polyphosphazene may be utilized in forming the blends of the invention. A preferred composition is an etheric phosphazene comprising repeating units of Formula (I):

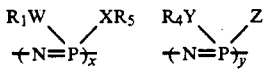

In the above formula, x and y represent molar percentages, with x being 80 to 100%, and y being 0 to 20%. $R_1$ and $R_5$ each independently represents the formula $-(R_2-O)_n-R_3$ where n is 1 to 50 and $R_3$ is hydrogen, alkyl, alkenyl, alkynyl, haloalkyl, haloakenyl, haloalkynyl, phenyl, substituted aromatic, amine, or thio of from 1 to 18 carbon atoms. In the repeating unit $-(R_2-O)-$, $R_2$ is randomly alkylene having from 2 to 4 carbon atoms in the straight chain between oxygen atoms.

W, X, and Y each independently represents $-O-$, $-S-$,

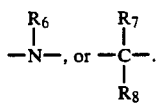

Z represents $-OR_9$, $-SR_{10}$,

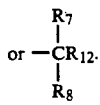

$R_4$, $R_6$, $R_7$, and $R_8$ each independently represents H, alkyl, alkenyl, alkynyl, haloalkyl, haloakenyl, haloalkynyl, phenyl, substituted aromatic, amine, or thio of from 1 to 18 carbon atoms. $R_9$ and $R_{10}$ each independently represents alkyl, alkenyl, alkynyl, haloalkyl, haloakenyl, haloalkynyl, phenyl, substituted aromatic, amine, or thio of from 1 to 18 carbon atoms or $-(R_{13}-O)_m-R_{14}$. $R_{11}$ and $R_{12}$ each independently represents H, alkyl, alkenyl, alkynyl, haloalkyl, haloakenyl, haloalkynyl, phenyl, substituted aromatic, amine, or thio of from 1 to 18 carbon atoms, or $-(R_{13}-O)_m-R_{14}$. $R_{13}$ is randomly alkyl of from 2 to 4 carbon atoms, having from 2 to 4 carbon atoms in the straight chain between oxygen atoms. $R_{14}$ is H, alkyl, alkenyl, alkenyl, alkynyl, haloalkyl, haloakenyl, haloalkynyl, phenyl, substituted aromatic, amine, or thio of from 1 to 18 carbon atoms and m is 0 to 50.

Polyphosphazene compounds that are useful in the present invention are those of Formula (I). In that formula, x and y represent molar percentages, with x being 80 to 100% and y being 0 to 20%. Preferred values for x are from 90 to 100%, and preferred values for y are from 0 to 10%.

$R_1$ and $R_5$ are independently represented by the formula $-(R_2-O)_n-R_3$. Useful compounds according to the invention are those where n is from 1 to 50. Especially preferred values for n are from 2 to 10.

$R_2$ and $R_{13}$ are each independently randomly alkylene of from 2 to 4 carbon atoms and preferably 2 to 3 carbon atoms, having from 2 to 4 carbon atoms and preferably 2 carbon atoms in the straight chain between oxygen atoms. By "randomly alkylene of from 2 to 4 carbon atoms," it is meant that the $R_2$ or $R_{13}$ in each of the repeating units $-(R_2-O)-$ or $-(R_{13}-O)-$ may be different from other $R_2$'s or $R_{13}$'s, as long as each of the $R_2$'s or $R_{13}$'s falls within the overall limitation of being between 2 to 4 carbon atoms, having from 2 to 4 carbon atoms in the straight chain between oxygen atoms. For example, where n=3 and $R_3$ is ethyl, $R_1$ could be $-CH_2CH_2-O-CHCH_3CHCH_3-O-CH_2CH-CH_3-O-C_2H_5$. Examples of $R_2$ include ethylene, n-propyl, isopropylene, and n-butylene.

$R_3$ and $R_{14}$ each independently represents (and $R_9$ and $R_{10}$ may each independently represent) alkyl, alkenyl, alkynyl, haloalkyl, haloakenyl, haloalkynyl, phenyl, substituted aromatic, amine, or thio typically of from 1 to 18 carbon atoms. Preferably, $R_3$ is alkyl, alkenyl, haloalkyl, or aromatic of from 1 to 8 carbon atoms. Useful as $R_3$ and $R_{14}$ groups include substituted alkyl, alkenyl, or aromatic groups of from 1 to 18 carbon atoms. Examples of substituents include halogen, such as F or Cl, amino groups such as $NH_2$, $NHCH_3$, or $N(CH_3)_2$, and thio-containing groups, such as alkylthio (e.g., methylthio, ethylthio) or sulfonate. A preferred substituted $R_3$ is a terminally halogen substituted alkyl group, such as a perfluoroalkyl. Examples of $R_3$ include $-CH_3$, $-CH_2CH_3$, $-CH_2CF_3$, $-CH_2CCl_3$, $-(CH_2)_5CH_3$, $-(CH_2)_4-CH=CH-CH_3$, $-CH_2-O-CH_3$, and $(C_6H_4)-(C_8H_{17})$.

$R_4$, $R_6$, $R_7$, and $R_8$ each independently represents (and $R_{11}$ and $R_{12}$ may each independently represent) hydrogen, alkyl, alkenyl, alkynyl, haloalkyl, haloakenyl, haloalkynyl, phenyl, substituted aromatic, amine, or thio typically of from 1 to 18 carbon atoms. Preferably, they are H or alkyl, or alkenyl of from 1 to 8 carbon atoms. Also useful are substituted alkyl or alkenyl groups of from 1 to 18 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) of sulfonate. Examples of $R_4$, $R_6$, $R_7$, $R_8$, $R_{11}$, and $R_{12}$ include $-CH_3$, $-CH_2CH_3$, $-CH_2CF_3$, $-CH_2CCl_3$, $-(CH_2)_5CH_3$, $-(CH_2)_4-CH=CH-CH_3$, $-CH_2-O-CH_3$, and $(C_6H_4)-(C_8H_{17})$.

The molecular weight of the compound of Formula (I) is preferably between $2 \times 10^3$ and $1 \times 10^8$, and more preferably between $1 \times 10^5$ and $1 \times 10^7$.

The salts that are useful when forming antistatic fibers with the multicomponent blends in the present invention are those that complex with the phosphazenes of Formula (I). Any salt that complexes with the phosphazenes is useful. Whether a salt complexes with the phosphazene can be easily determined by methods known in the art, such as electrical conductivity measurements, differential scanning calorimetry (DSC) (measuring changes in glass transition temperature), vibrational spectroscopy, and nuclear magnetic resonance, or a combination thereof. Further disclosure on phosphazene/salt complex formation is presented in Blonsky, Shriver, Austin, & Allcock, *Solid State Ionics* 1986, 18-19, pp. 258-64.

A number of factors can be utilized to determine whether the salt will be likely to complex with the etheric phosphazene. The greater the flexibility of the polymer backbone of the polyphosphazene, the more receptive it is to complexing with all salts. Similarly, the higher the concentration of polar groups in the phosphazene, the more receptive it is to complexing with all salts. Salts that have a greater solubility with the phosphazene will tend to complex with the phosphazene to a greater extent than salts with lower solubility. Salts with a low lattice energy tend to complex with the etheric phosphazene to a greater extent than salts with a high lattice energy. Salts with bulky anions tend to complex with the phosphazene to a greater extent than salts with smaller anions. Also, salts with lower valence charges (e.g., mono and divalent salts) tend to complex with the phosphazene to a greater extent than salts with greater valence charges (e.g., trivalent salts).

Typical salts suitable for antistatic compositions of the invention include $KCF_3SO_3$, $Ca(CF_3SO_3)_2$, $Zn(BF_4)_2$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, LiI, NaI, KI, $C_4F_9SO_3K$, $KPF_6$, $NaB(C_6H_5)_4$, $LiCF_3SO_3$, $LiClO_4$, KSCN, LiSCN, and NaSCN. One skilled in the art could easily choose a number of additional salts according to the invention, given the salts exemplified above, the factors leading to a likelihood of the salt complexing with the polyphosphazene, and the above-described tests to determine whether the salt complexes with the polyphosphazene.

The material that forms the metal oxide in the blend of the invention may be derived from highly reactive inorganic monomers having a hydrolyzable leaving group that are soluble in the solvents for the phosphazene, and that are capable of forming a network via hydrolysis and condensation. The metal of the metal oxide may be defined as any electropositive chemical element characterized by ductility, malleability, luster, conductance of heat, and electricity, which can replace the hydrogen of an acid and forms bases with the hydroxyl radical. According to a particularly preferred embodiment, the oxides employed are titanium or zirconium heteropolycondensates that have been prepared by hydrolysis and polycondensation of at least one monomer of the general formula $MX_4$ wherein X is hydrogen, halogen, alkoxy, aryloxy, carboxy, or an $-NR_2$ group, in which R is hydrogen and/or alkyl, and/or aryl with the proviso that not all of X are hydrogen, and M is a metal. Also suitable are heteropolycondensates in which at least some of the titanium or zirconium has been substituted by other metals including aluminum, boron, indium, tin, tantalum, lead, phosphorus, lanthanum, iron, copper, yttrium, and germanium. Barium and magnesium oxide mixtures with above metal oxides also may be utilized in the invention. The preferred substituted materials are titanium alkoxide and zirconium alkoxide, as these materials appear easier to form into fibers.

The polyphosphazene, metal oxide, and optionally salt, such as potassium triflate, form the required elements for the invention. It is also possible that the compositions of the invention may contain other materials such as fillers or materials such as fire retardants or coating aids. Although genrally opaque, the composite blends of the invention may be transparent as all or substantially all of the areas of metal oxide have a size of less than 2000 Å and preferable less than 500 Å for the strongest and most transparent fibrous materials. However, in some instances there may be impurities or deliberately added dyes or pigments that render the products non-transparent. The term "transparent" as used herein means that letter quality pica print on white paper can be read through a 0.5 cm thick layer of the composite blend material when formed in a layer rather than used in fiber formation as in the invention.

The temperature at which curing of the fibers takes place may be any desired temperatures that provides sufficient condensation of the materials utilized. Typical curing temperatures are between about 25° C. and 200° C.

The method of forming the composite fibers of the invention include any conventional polymer fiber forming process. Typical of such processes are extruding, spinning, and drawing of the fibers. Further, many of the materials may be cast on water and fibers drawn from materials on the surface of the water, or they can be wet spun from solution into a water or steam bath.

The phosphazene and metal oxide of the invention may be combined in any amounts that give a suitable fiber. Typical of such combinations are those of between about 20% and about 95% by weight of the phosphazene combined with between about 5% and about 80% by weight of the material forming the metal oxide. It has been found that an amount of between about 40 and about 60 weight percent of phosphazene in combination with between about 40 and about 60% by weight of the inorganic oxide precursor is suitable to give products of desirable strength. A preferred blend has been found to be about 70% of the metal alkoxide for the best balance of strength, hardness, flexibility, and conductivity.

The finished composite material after curing typically has a metal oxide content of between about 1 and about 60% by weight. At higher oxide contents the fibers become brittle and may fall apart when flexed or handled. A preferred amount of metal oxide content is between about 10% and about 40% by weight to form a strong and continuous network of the metal oxide in the fibers. The optimum amount of metal oxide for oxides of titanium, and zirconium has been found to be between about 15% and about 25% by weight for the strongest and most flexible materials.

The amount of salt utilized in the conductive fibers may be any amount that gives a suitable amount of conductivity in the product being formed. Typical weight of salt is between about 5 and about 20 weight percent of the finished product.

EXAMPLES

The practice of the invention is further illustrated by the following examples:

Preparation 1—Poly(dichlorophosphazene)

Poly(dichlorophosphazene) was prepared by the thermal polymerization of hexachlorocyclotriphosphazene [$(NPCl_2)_3$] at 250° C. Polymerization of $(NPCl_2)_3$ was carried out in sealed Pyrex ™ glass tubes of size 23×3.5 cm (200 g scale). Crushed Pyrex glass (2 g) was added to the tube to facilitate initiation. The tubes were evacuated on a vacuum line for 30 minutes before they were sealed. The sealed tubes were heated at 250° C. until the contents became viscous, about 24 hours. After the tubes had cooled to room temperature, they were placed in a glove bag filled with argon, the Pyrex tube broken open, and the contents placed in a sublimator. The bulk of the starting trimer (50 g) was removed from the polymer during the sublimation (50° C., 16 hours). The remaining polymer was a white material that was highly elastomeric and formed clear viscous solutions in tetrahydrofuran and toluene.

Preparation 2—Poly[bis(2-(2-methoxyethoxy)ethoxy)phosphazene] (MEEP).

A solution of poly(dichlorophosphazene) (33 g, 0.28 mol) in tetrahydrofuran (500 ml) was added over a 3-hour period to a stirred suspension of sodium 2-(2-methoxyethoxy)ethoxide, prepared from sodium hydride (40 g, 0.83 mol) and 2-(2-methoxyethoxy)ethanol (150 g, 1.25 mol) in THF (500 ml). Tetra-n-butylammonium bromide (0.5 g) was added. The reaction was stirred for 48 hours at room temperature and then was refluxed for one hour to finish the substitution. The reaction was neutralized with 5% HCl. The reaction mixture was dialyzed against water and freeze-dried. The freeze-dried polymer (60 g) was dissolved in acetone (800 ml) and filtered through a coarse glass frit. It was then precipitated into heptane (4×1500 ml). The polymer was redissolved in acetone and reprecipitated into heptane as before. A $^{31}P(^1H)$ NMR spectrum consisted of a sharp singlet at $-7.6$ PPM, which was indicative of total halogen replacement. Yield was 23%. IR (P=N), 1240 cm$^{-1}$. Intrinsic viscosity was 1.06 dl/g. Low angle laser light scattering gave an apparent weight average molecular weight of $5.4 \times 10^5$ gm/mol. Elemental analysis (found/theoretical, %): N (5.0/4.9), C (41.8/42.4), H (7.6/7.8), P (11.3/10.9), Cl ($<0.3/0.0$).

EXAMPLES

A MEEP solution for Examples 1–4 was formed by combining the MEEP of Preparation 2 with tetrahydrofuran (THF) at the rate of 10 grams MEEP per 100 grams THF.

EXAMPLE 1

1:3 MEEP:zirconium alkoxide by weight of the stock MEEP solution (2 g) was stirred with a magnetic stirrer in a 4 dram vial. Zirconium butoxide n-butanol complex (0.64 g) was added, the solution shaken vigorously by hand, followed by heating in a 65° C. oil bath for five minutes. The clear, viscous fluid was poured into a 2 mL syringe and expelled through an 18 gauge one-inch needle to produce a clear fiber with a slight yellow color. The fiber turned opaque and became brittle over a period of four days.

EXAMPLE 2

1:1.5 MEEP:zirconium alkoxide by weight. The same procedure was followed as described in Example 1 using the MEEP solution (2 g) and zirconium butoxide n-butanol complex (0.32 g). The fiber was similar in appearance to the one described above but remained flexible after four days.

EXAMPLE 3

1:1.5:0.05 MEEP:zirconium alkoxide:salt antistat. The same procedure was followed as described in Example 1 using the MEEP solution (2 g) and zirconium alkoxide (0.32 g), except that lithium triflate (0.01 g) was added after warming the sample. Clear fibers were extruded from a Pasteur pipet.

EXAMPLE 4

1:3 MEEP:titanium alkoxide. The same procedure was followed as in Example 1. The MEEP solution (0.1 g) was mixed with titanium isopropoxide (0.33 g). The fibers were opaque immediately after forming.

EXAMPLE 5

Dry spinning of a MEEP(polyphosphazene)/titanium isopropoxide fiber. A 10 weight percent solution of polyphosphazene (MEEP) in acetone was prepared using 9 grams of MEEP. To this solution, 18 grams of titanium isopropoxide was added while mixing. The resulting solution was concentrated to an appropriate spinning viscosity by pulling off acetone in a rotor-vap at 25° C.

The solution was then loaded into an Instron extruder equipped with a capillary outlet from a barrel held at 29° C. Fibers were extruded by applying pressure to the top of the barrel. These fibers, when dry, were rubbery, flexible, self-supporting, and could endure a high degree of extension before breaking.

This example demonstrates that high quality fibers of etheric phosphazenes with metal oxides can be obtained by the use of proper fiber extrusion techniques.

The above examples illustrate that fibers may be successfully prepared from zirconium and titanium oxide blends with the etheric phosphazene. Utilized in the Examples 1–4 was about a 10% solution of MEEP in tetrahydrafuran (THF). Attempts were made using processes similar to those of Examples 1–4 to form zirconium and titanium fibers from solutions of about 2% MEEP and 20% MEEP. These attempts were unsuccessful utilizing the syringe and Pasteur pipet. However, this is not believed to be determinative that the invention can only be formed at about a 10% solution, as the non-sophisticated fiber-forming techniques utilized in the Examples 1–4 do not exhaust the possiblities of standard fiber formation techniques. It would be recognized by one ordinarily skilled in the art that proper fiber extrusion techniques would result in fibers from other solution concentrations. Similarly, attempts to make silicon by techniques such as in Examples 1–4 also were unsuccessful; however, it is again considered that this is only a failure of the primitive fiber-forming techniques and failure to experiment with fiber-forming conditions, as there does not appear to be any technological reason why fibers could not be formed by extrusion of these materials. It is surprising that silicon alkoxides failed to yield fibers, probably due to the slower rate of oxide formation of tetraethoxysilane. We believe that increasing the rate of hydrolysis and/or condensation by the addition of acid or base, or using a more reactive oxide precursor, would yield other phosphazene metal oxide fibers. The important factor appears to be controlling the sol-gel rate of reaction. By increasing the rate of reaction for silicon, one should be able to obtain fibers.

This invention has been described in detail with particular reference to particular embodiments thereof, but it will be understood that variations and modifications can be effected within the scope and spirit of the invention. The invention is only intended to be limited by the breadth of the claims.

We claim:

1. Composite fiber comprising a multicomponent blend of etheric phosphazene and metal oxide wherein said metal oxide comprises between about 1 and about 80 percent by weight of said composite.

2. The composite fiber of claim 1 wherein said metal oxide comprises between about 10 and about 60 percent by weight of said composite.

3. The composite fiber of claim 2 wherein the metal of said metal oxide is selected from the group consisting of titanium, zirconium, and mixtures thereof, and said metal oxide is present in an amount of between about 10 and about 30 percent by weight of said composite.

4. The composite fiber of claim 2 wherein the metal portion of said metal oxide is selected from at least one member of the group consisting of titanium, boron, aluminum, zirconium, tin, germanium, indium, tantalum, lead, lanthanum, iron, copper, yttrium, barium, magnesium and mixtures thereof.

5. The composite fiber of claim 1 wherein said etheric phosphazene comprises at least one material selected from those consisting of a phosphazene polymer comprising repeating units for the formula:

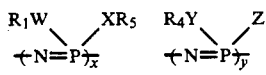        I.

wherein x and y represent molar percentages, with x being 80 to 100% and y being 0 to 20%,
wherein x and y represent molar percentages, with x being 80 to 100% and y being 0 to 20%,
$R_1$ and $R_5$ each independently represents the formula $-(R_2-O)_n-R_3$ wherein n is 1 to 50, $R_2$ is randomly alkyl of from 2 to 4 carbon atoms, having from 2 to 4 carbon atoms in the straight chain between oxygen atoms, and $R_3$ is alkyl, alkenyl, alkynyl, haloalkyl, haloalkenyl, haloalkynyl, phenyl, substituted aromatic, amine or thio of from 1 to 18 carbon atoms,
W, X, and Y each independently represents —O—, —S—,

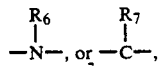

Z represents $-OR_9$, $-SR_{10}$,

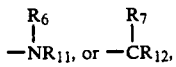

wherein $R_4$, $R_6$, $R_7$, and $R_8$ each independently represents H, alkyl, or alkenyl of from 1 to 18 carbon atoms,
$R_9$ and $R_{10}$ each independently represents alkyl, alkenyl, alkynyl, haloalkyl, haloalkenyl, haloalkynyl, phenyl, substituted aromatic, amine, or thio of from 1 to 18 carbon atoms or $-(R_{13}-O)_m-R_{14}$,
$R_{11}$ and $R_{12}$ each independently represents H, alkyl, alkenyl, alkynyl, haloalkyl, haloalkenyl, haloalkynyl, phenyl, substituted aromatic, amine or thio of from 1 to 18 carbon atoms, or $-(R_{13}-O)_m-R_{14}$,
$R_{13}$ is randomly alkyl of from 2 to 4 carbon atoms, having from 2 to 4 carbon atoms in the straight chain between oxygen atoms,
$R_{14}$ is alkyl, alkenyl, alkynyl, haloalkyl, haloalkenyl, haloalkynyl, phenyl, substituted aromatic, amine, or thio of from 1 to 18 carbon atoms, and
m is 0 to 50.

6. The composite fiber of claim 1 further comprising a salt.

7. The composite fiber of claim 6 wherein the salt is selected from the group consisting of $KCF_3SO$, $Ca(CF_3SO_3)_2$, $Zn(BF_4)_2$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, LiI, NaI, KI, $C_4F_9SO_3K$, $KPF_6$, $NaB(C_6H_5)_4$, $LiCF_3SO_3$, $LiCaO_4$, KSCN, LiSCN, and NaSCN.

8. The composite according to claim 5 wherein n is from 2 to 10, wherein W and X each independently represent —O—, and wherein $R_2$ and $R_3$ are each independently methyl, ethyl, or perfluoroethyl.

9. The composite fiber of claim 5 wherein $R_2$ and $R_{13}$ are each ethyl, and $R_3$, $R_4$, and $R_{14}$ are each independently methyl, ethyl, or perfluoroethyl.

10. The composite fiber according to claim 1 wherein said polymeric phosphazene comprises poly[bis(2-(2-methoxyethoxy)ethoxy)phosphazene].

* * * * *